July 3, 1923.
V. W. SWOVELAND
FISHING TOOL
Filed June 1, 1920
1,461,006
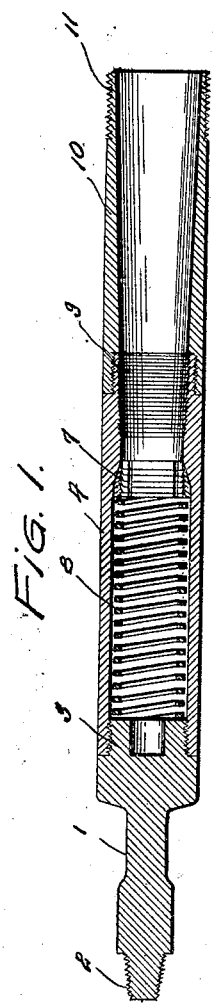
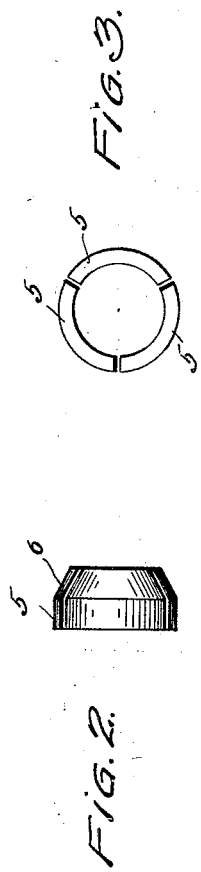
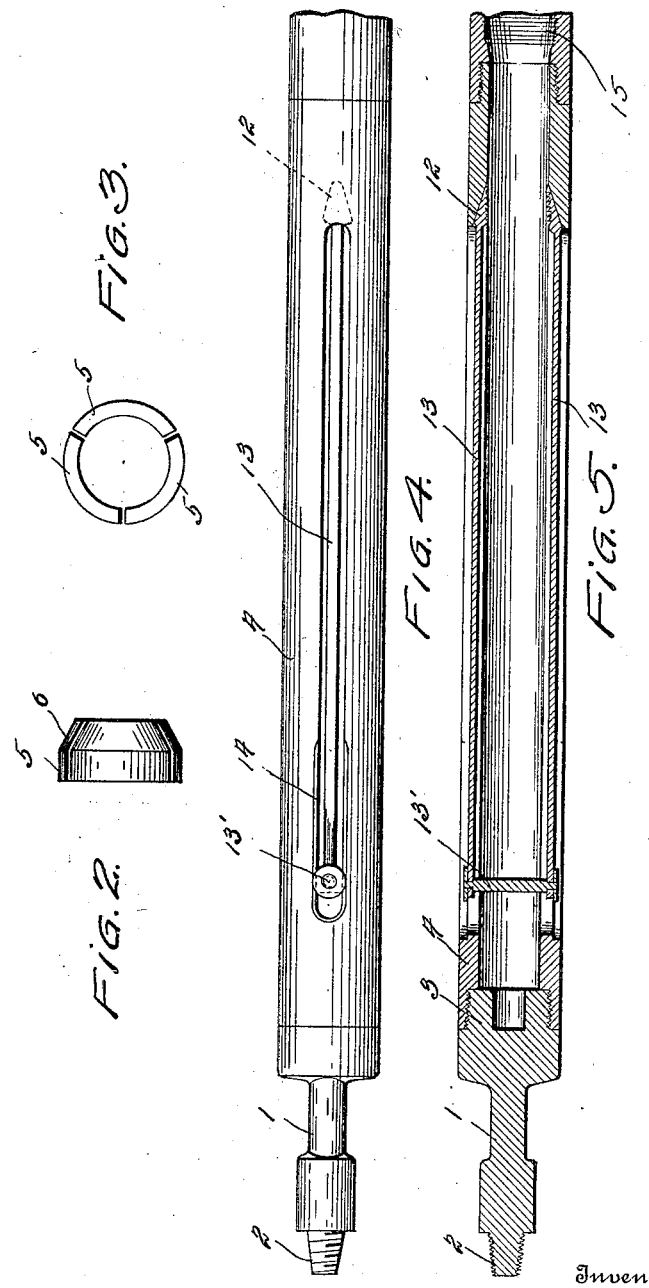
Inventor:-
Virgil W. Swoveland,
By Langdon Moore,
Attorney
Witness
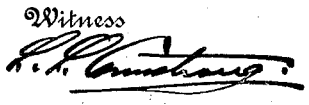

Patented July 3, 1923.

1,461,006

UNITED STATES PATENT OFFICE.

VIRGIL W. SWOVELAND, OF TULSA, OKLAHOMA.

FISHING TOOL.

Application filed June 1, 1920. Serial No. 385,592.

*To all whom it may concern:*

Be it known that I, VIRGIL W. SWOVELAND, a citizen of the United States, residing at Tulsa, Oklahoma, have invented certain new and useful Improvements in a Fishing Tool, of which the following is a specification, reference being had therein to the accompanying drawings.

This invention relates to so-called fishing tools. In the drilling of wells and the like a string of drilling tools is frequently lost in the hole, hundreds of feet below the surface. It becomes necessary to use fishing tools to withdraw the drilling tools, and many devices for this purpose have been designed. In most of them a series of successive operations is necessary, various tools being used, each one having to be drawn to the surface and another substituted.

It is contemplated, among the objects of the present invention, to provide a combination tool including a guide for positioning the lost string of tools and maintaining them in proper position while other instrumentalities are brought into play; to provide a cutting instrumentality to eliminate anything like rope, shale, or foreign matter which may lodge betweeen the fishing tools and drilling tools to be recovered; and finally, to associate with the guiding and cutting instrumentality a gripping instrumentality which will positively and securely grasp either the head of a socket or the body of a tool in such a way that the more force there is exerted to withdraw the tool, the more firmly will be the grip of the fishing tool.

Other objects are to combine a jar socket and the instrumentalities mentioned, in one tool; to so arrange the component parts that they will be readily interchangeable and quickly attached to and detached from subs now in use; which will permit the use of other tools, such as a wall hook or the like in combination; and which will, in a word, perform at one operation and without removal from the hole, functions and effect results frequently requiring varied and difficult steps.

A drawing illustrating an embodiment of the invention is hereto annexed and wherein the following views are shown:—

Fig. 1, is a view in transverse longitudinal section;

Figures 2 and 3 are a side elevation and top plan of a portion of the apparatus shown in Fig. 1;

Figs. 4 and 5 are views in side elevation and section respectively of an embodiment of the invention.

In these drawings 1 designates a shank or sub of a jar socket. It is threaded as at 2, or otherwise arranged for connection with a rope socket or other portions of a drilling string and has at its opposite end a reduced portion 3. This portion is provided with means for carrying a casing 4, here shown threaded upon the reduced portion 3.

Within the casing there is disposed means for gripping a portion of a lost string of tools and as here shown, hardened metal gripping members 5, having a beveled or tapered portion 6, bearing on a tapered portion 7 on the interior of the casing, have gripping teeth on their inner surface for engagement with the head of a drill socket or the like. These members are normally held seated on the beveled portion of the casing as by a spring 8. It will be seen that if the head of a drill or rope socket corresponding to the head 2 of the jar socket, is forced upwardly against the gripping members, they will give sufficiently in one direction to permit the insertion of the head, but that any attempt at withdrawal will only tend to tighten the grip of the teeth on the head. The shank and casing being detachably connected, permit ready removal of the sub.

Means are provided for cutting any foreign matter such as rope, wire-line, the battered head of a socket, or the like, which might come between the gripping instrumentality and a string of tools to be removed, and to this end, as seen in Fig. 1, there is a tapered portion on the inside of the casing which decreases in size from the outer end as it approaches the gripping members. This is provided with a cutting instrumentality 9, here shown in the form of hardened notches, or teeth arranged annularly along the interior tapered portion of the casing. As the head of the sub or socket is just large enough to freely move through the smallest portion of the taper, any foreign substance around the head will be ground off by the vertical movement of the tool or jarring action of the drill rig.

Means are also provided for positioning or centering a lost string of tools within the hole and maintaining them in fixed and predetermined position while the other instrumentalities are being brought into play, and to this end there is provided a guiding member 10, having at one end means for attaching it to the casing 4, the same being here shown threaded upon a reduced portion of the casing. This guiding instrumentality is preferably tapered upon its interior and of sufficient length to permit the normal vertical movement of the jar without leaving the head of the string of tools to be removed. In other words, it is so arranged that when lowered over a string of tools it will force them away from the side of the hole and maintain them in centered relation to the sides of the hole. It will also be of sufficient length to permit the full vertical movement of the jar without passing out of engagement with the head of the string of tools to be recovered. The outer end of this guiding instrumentality is also provided with means for attachment to any other form of tool which may be desired to use, a threaded reduced portion 11 being here shown and to which a wall hook or the like may sometimes be fastened if a string of tools is lodged in a depression or sandy portion of a hole.

It is sometimes necessary and desirable to grip the body of a string of tools instead of the head, as for instance where a jar breaks off at a point beyond the head. In such cases the gripping device shown in Figs. 4 and 5 is provided. Here, gripping members 12, having a tapered portion bearing on a like portion of the casing as in Fig. 1, are provided with extensions 13, connected at their upper extremities by a bolt or rivet 13', the heads of which have a sliding bearing in a slot 14 on each side of the casing. In this arrangement the grippers engage the body of the lost tool and force applied to remove them will tighten the grippers against the tapered portion of the casing. Instead of having the cutting instrumentality on the inside of the casing, it may be applied to the inside of the guiding instrumentality as indicated at 15 in Fig. 5.

The tool forming the subject matter of the present invention has been found particularly efficient in overcoming many objections to devices of this character and in accompanying the various objects and advantages enumerated. While it has been disclosed in the embodiment herein shown, it will be understood that I do not wish to be limited to the precise form of this disclosure, as many changes in the arrangement and construction of the parts may be resorted to without departing from the spirit of the invention or its scope as set forth in the claims.

What I claim is:—

1. A fishing tool comprising a jar having a casing provided with a hollow interior portion; a portion of the casing being formed to force a lost drilling tool away from the wall of a well casing and into the hollow interior portion of the jar; means, associated with the jar, for gripping the lost tool when the jar is lowered into engagement therewith, and means carried by the jar for severing a rope from the lost drilling tool.

2. A fishing tool comprising a jar having a casing provided with a hollow interior portion; a portion of the casing being formed to force a lost drilling tool away from the wall of a well casing and into the hollow interior portion of the jar; means, associated with the jar, for gripping the lost tool when the jar is lowered into engagement therewith; means, carried by the jar for severing a rope from the lost drilling tool, and a member adapted to be attached to the jar, said member having tapered portions adapted to move a lost drilling tool away from the wall of a hole and forming a continuation of the guiding means on the jar, when attached thereto.

3. A fishing tool comprising a jar having a casing provided with a hollow interior portion; a portion of the casing being formed to force a lost drilling tool away from the wall of a well casing and into the hollow interior portion of the jar; means, associated with the jar, for gripping the lost tool when the jar is lowered into engagement therewith; means, carried by the jar for severing a rope from the lost drilling tool, and a member adapted to be attached to the jar, said member having tapered portions adapted to move a lost drilling tool away from the wall of a hole and forming a continuation of the guiding means on the jar, when attached thereto, said member including a tubular casing having means thereon for attachment to the jar, and provided with tapered interior walls converging toward the point of attachment with the jar.

4. A fishing tool comprising a jar having a casing provided with a hollow interior portion; a portion of the casing being formed to force a lost drilling tool away from the wall of a well casing and into the hollow interior portion of the jar; means, associated with the jar, for gripping the lost tool when the jar is lowered into engagement therewith; means, carried by the jar for severing a rope from the lost drilling tool, and a member adapted to be attached to the jar, said member having tapered portions adapted to move a lost drilling tool away from the wall of a hole and forming a continuation of the guiding means on the jar, when attached thereto, and means on the member for securing a well hook thereto.

5. A fishing tool comprising a jar having a casing provided with a hollow interior portion; a portion of the casing being formed to force a lost drilling tool away from the wall of a well casing and into the hollow interior portion of the jar; means, associated with the jar, for gripping the lost tool when the jar is lowered into engagement therewith; and means, carried by the jar for severing a rope from the lost drilling tool; said rope severing means including a sloping interior wall on the casing; and cutting instrumentality disposed thereon.

6. A fishing tool comprising a jar having a casing provided with a hollow interior portion; a portion of the casing being formed to force a lost drilling tool away from the wall of a well casing and into the hollow interior portion of the jar; means, associated with the jar, for gripping the lost tool when the jar is lowered into engagement therewith; means, carried by the jar for severing a rope from the lost drilling tool; said rope severing means including a sloping interior wall on the casing, cutting instrumentality disposed thereon; said cutting instrumentality including a cutting tooth disposed on the sloping interior wall of the casing.

7. A fishing tool comprising a casing in the form of a jar and having at one end thereof means for attaching it to a string of well drilling tools; gripping instrumentality on the casing adapted to engage a lost well drilling tool when the casing is carried into engagement therewith; a tapered interior wall on the casing adapted to encircle a lost tool and direct it toward the center of the casing; and a plurality of rope cutting serrations disposed on the tapered portion of the casing wall and adapted to sever a rope from a well drilling tool when the casing is forcibly driven down on the lost tool.

8. A fishing tool comprising a body portion; means at one end thereof for attachment to another member; gripping instrumentality carried by the body portion; a cutting instrumentality adapted to be effective before the gripping instrumentality is brought into play; and a guiding member associated with the body portion.

9. A fishing tool comprising a body portion; gripping instrumentality carried by the body portion; and a cutting instrumentality associated with the body portion and adapted to be effective in advance of the gripping instrumentality.

10. The structure set forth in claim 9, and a guide member associated therewith.

VIRGIL W. SWOVELAND.